Jan. 13, 1959 E. V. HOUK 2,869,077

METHOD AND MEANS FOR IDENTIFYING WIRE-PAIRS

Filed March 29, 1954 3 Sheets-Sheet 1

INVENTOR.
EMORY V. HOUK
BY Peter P. Price
ATTORNEY

Jan. 13, 1959 E. V. HOUK 2,869,077

METHOD AND MEANS FOR IDENTIFYING WIRE-PAIRS

Filed March 29, 1954 3 Sheets-Sheet 2

INVENTOR.
EMORY V. HOUK
BY Peter P. Price
ATTORNEY

INVENTOR.
EMORY V. HOUK
BY Peter P. Price
ATTORNEY 2,869,077

METHOD AND MEANS FOR IDENTIFYING WIRE-PAIRS

Emory V. Houk, Grand Rapids, Mich.

Application March 29, 1954, Serial No. 419,357

13 Claims. (Cl. 324—66)

This invention relates to communications equipment and more particularly to a method and means whereby a splicer working in the field on a multi-pair cable may, through the use of automatic equipment and without the continuing help of an assistant at the office, select and positively identify by main frame pair number any one or all of the individual wire-pairs of the cable.

While this invention is described as applied to telephone equipment, it will be recognized that it may readily be used for the purpose of identifying wire-pairs and their numbers in any multi-pair cable irrespective of the cable's ultimate use.

Telephone cables are, at least on one end, secured to a terminal panel. At the terminal panel each individual wire of each wire-pair is secured to an individual post. The posts are arranged in a predetermined order and are normally identified by numbers ranging from one through one hundred one or more pairs for each cable. While a greater or lesser number of wires may be incorporated in such a cable, the use of cables having more than one hundred one pairs is most common in telephone equipment in this country. This invention is useable with cables irrespective of the number of wire-pairs involved.

The problem arises where such a cable, at one end, is to be spliced to other cables or to be attached to another terminal panel, making it necessary to know the positive identity of each wire-pair and its relationship to the terminal panel pair number at the other end of the cable. The problem may arise either where the outside cable is to be terminated or a portion or all of the cable is to be spliced into another cable. The need for pair number identification occurs in all cable splicing work whether inside or outside, such as when extending the cable system, placing terminals and all rearrangement work within the cables to promote full pair usage.

The most efficient system heretofore known for identifying these wire-pairs consisted in utilizing the services of a splicer at the end of the cable where the wires were unidentified and a splicer's helper at the office or other place where the wire-pairs were permanently terminated and identified. In order to initiate operations, a splicer's helper normally selects the odd wire-pair of the largest numerical order such as wire-pair one hundred one in a one hundred one wire-pair cable and places a tone signal on this wire-pair. The splicer, by means of a suitable instrument, probes the cable until his instrument indicates the particular pair carrying the tone signal. He then connects suitable voice transmitting equipment to that pair to enable him to converse with his helper at the other end of the cable. The splicer's helper then places a tone signal or another wire-pair and the probing operation is repeated by the cable splicer in the field. When this wire-pair has been identified by the probing instrument, the splicer identifies the pair after receiving from his helper the proper identification number for that pair. This procedure is repeated until all, or as many as necessary, of the wire-pairs have been identified and tagged by the splicer in the field.

Such a method requires the continuous service of two men for each splicing operation. Further, should the splicer's helper make an error, that error will automatically become incorporated in the identification of the wires in the field. If this error is not discovered in time, it may subsequently lead to substantial difficulty.

Further, this system sometimes causes difficulty because it is frequent that this identification procedure has to be carried out in a cable in which some of the wire-pairs are operating and some are not. The activities of the splicer's helper in connecting to and disconnecting from the various terminals, some of which he may not be able to determine as being in operation, can produce undesirable interference with the use of the operating wire-pairs.

My invention eliminates all of this. By means of my invention the splicer's helper is replaced by automatic selection equipment of a standard and readily available type. While selection equipment of one type or another has been used for this purpose, it has never replaced the splicer's helper because it has been incapable of positively identifying the cable pairs in the field with the corresponding numerical identification that they bear at the terminal end of the cable. By means of my invention the splicer in the field may, without the services of any other person, cause the selection equipment to place a tone signal on a predetermined wire-pair which wire-pair is determined by the numerical identification which that wire-pair bears at the end of the cable at the selector. In this manner, the splicer in the field, having found the wire-pair bearing the tone signal, immediately knows both that this is the particular wire-pair selected and the numerical identification of that wire-pair at the cable terminal.

My invention permits this identification to be carried out rapidly and positively whereby there can be no errors except that which might be made by the splicer in the field. All possibility of error in the selection of the wire-pair carrying the tone at the terminal end of the cable is eliminated.

Further, this invention is adaptable to use either on cables in which no wire-pairs are operating or on cables having a portion of the wire-pairs actually in operation. The operation of this equipment will cause no interference with those cable pairs which are actually in operation.

These and other objects and advantages of my invention with be readily seen by those acquainted with the construction and maintenance of equipment involving the identification of wire-pairs in multi-wire pair cables upon reading the following specification and the accompanying drawings.

Figure 1:
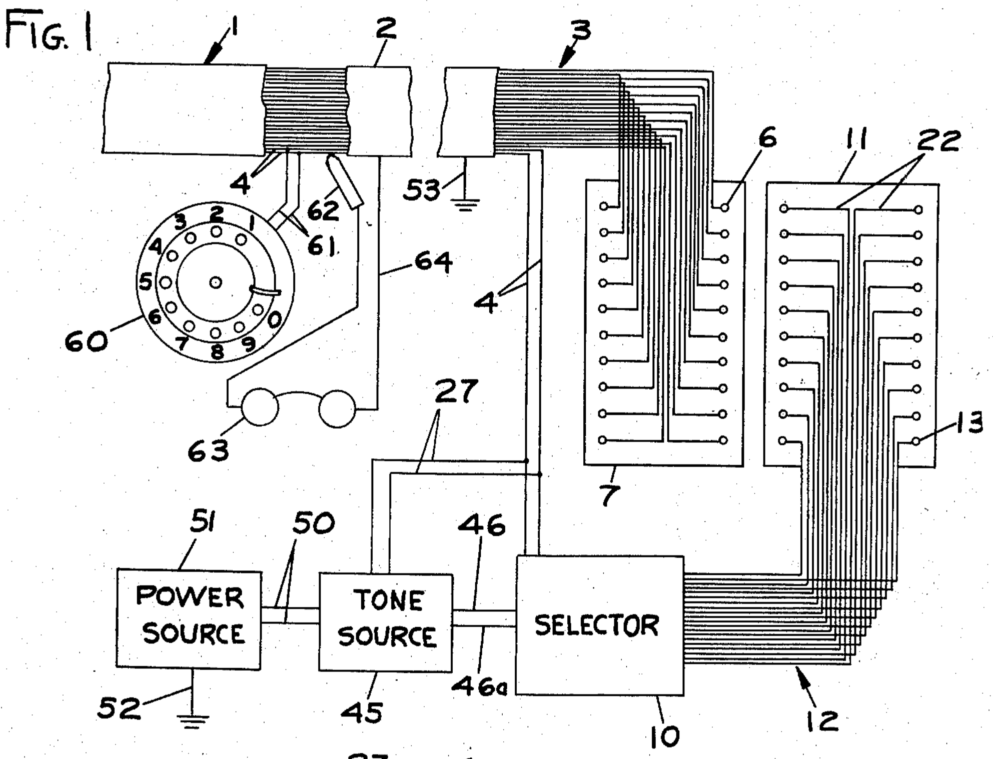
Fig. 1 is a diagrammatic presentation of my invention.

In executing the objects and purposes of my invention, I have provided a connecting panel of such size and shape that it may be detachably secured to the conventional terminal panel to which the multi-wire telephone cable is terminated and the ends of its wires attached. This connecting panel has a plurality of contacts corresponding in number and spacing to the number and spacing of the terminal posts on the conventional terminal panel for the cable. Each of the contacts is permanently connected to automatic selector equipment of conventional design by means of a flexible cable.

The actuating mechanism of the selector equipment is attached to a predetermined wire-pair of the cable. In the field this same wire-pair is connected to standard telephone dial equipment for controlling the operation of the selector. The selector in turn is connected to a tone source which is connected to a power source such as the battery or generator at a telephone office. The splicer in the field, in addition to the dial equipment, has a probe designed to pass between the wire-pairs of the cable and to pick up a tone signal carried by any of the wire-pairs whereby the splicer may determine in the field which of the wire-pairs is connected by the selector to the tone signal source.

The splicer may, by dialing a predetermined two or three digit number, cause the selector to connect that wire-pair of the cable having the corresponding numerical identification to the tone source. By means of the probing instrument, the splicer may then identify which of the wire-pairs is carrying that tone signal. When he has found this wire-pair he knows that the particular wire-pair is connected to the post at the cable terminal panel post bearing the same number as that which he dialed. He may then tag that wire and know positively its identification at the terminal panel.

Referring specifically to the drawings, the numeral 1 indicates a cable having an external protective sheath 2, normally of conductive material such as lead. The cable contains a plurality of wire-pairs collectively designated as 3. In the conventional telephone cable, the two wires of each pair are wound about each other. Therefore, if one wire of the pair is known the other wire of that pair is also known because it is directly associated with it.

While the conventional telephone cable contains an odd number of wire-pairs 3, the total number depends upon the size of the cable, the standard large cable containing up to 3,636 pairs. In cables of more than one hundred one pairs, the wire-pairs are arranged in groups of one hundred one pairs. Sometimes only one hundred of the wire-pairs are used with one pair retained as an emergency spare. However, it is common practice to use all wire-pairs in the cable. For purposes of illustration, the cable has been shown as containing eleven pairs with ten pairs actively used and the remaining pair, identified as wire-pair 4, retained as a spare. Eleven pairs is merely an empirical selection of the number of wires in the cable for the purpose of illustrating the principles of this invention. It will be recognized that the invention may be applied to any cable containing any number of pairs.

The remaining ten wire-pairs 3 are each connected to separate posts 6 on the terminal panel 7. Each wire of the pair is attached to a separate post 6. While the posts 6 may be arranged in any pattern, they are preferably arranged in two vertical columns with the wires of each pair attached to posts lying in the same plane laterally of the terminal panel 7. The length of the terminal panel 7 will depend upon the number of posts 6 necessary to accommodate the wires of the particular cable. When the cable contains eleven wires, there will be eleven pairs of posts 6 and when the cable contains one hundred one wire pairs 3, it will contain one hundred one pairs of posts 6.

The terminal panel 7 and its associated equipment is of conventional design. It is the type normally found in the present day automatic telephone exchange. In such an exchange, the panels 7 are mounted one above another so that in a single vertical column hundreds and sometimes thousands of wires are terminated. However, such a column of panels 7 are divided normally into groups of one hundred one, each group forming a panel. Each of the panels is normally identified by a code number or letter or combination of letters and numbers to facilitate identification and location. It is to this structure that my invention is attached.

The invention utilizes an automatic selector 10. The selector 10 is connected to a connecting panel 11 by means of a flexible multi-wire cable generally designated as 12. The multi-wire cable 12 has a plurality of wire-pairs 22 each wire of which is secured to an individual contact 13. The contacts 13 are mounted to the connecting panel 11 in two parallel rows with the rows spaced the same distance laterally of the panel as the rows of posts 6 on the terminal panel 7. The vertical spacing between the connectors 13 is also identical to the vertical spacing between the posts 6. By this arrangement, when the connecting panel is placed over the terminal panel 7, the connectors 13 will align with the posts 6 so an individual electrical contact is made between each of the posts and each of the connectors.

Figure 5:
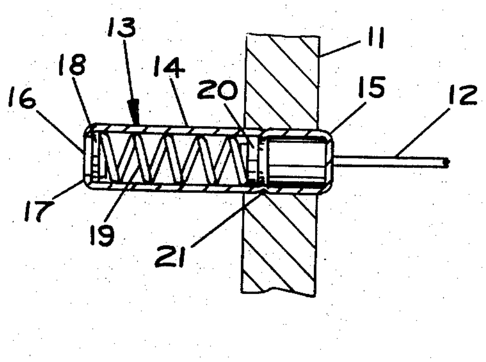
Fig. 5 is an enlarged, fragmentary, central sectional view of one of the contacts of the removable connecting panel.

While the contacts 13 may be designed in numerous ways to meet the purposes of this invention, a simple and effective construction consists of a shell 14 generally closed at the end 15 and having an opening 16 at the end directed toward the posts 6 (Fig. 5). The open end 16 is surrounded by a short inturned lip 17. The lip 17 prevents the escape of the sliding disc 18 through the open end of the shell. The disc 18 is urged toward the opening 16 by a light duty spring 19, the other end of which bears against the plate 20. The plate 20 is held in position by crimping the shell at 21. Each of the connectors 13 is attached to one of the wires of the cable 12.

The size of the opening 16 is such that it will permit the free end of a post 6 to pass into the shell 14 and bear snugly against the sliding disc 18. In this manner an electrical circuit is completed through the posts 6 and the connectors 13 from the wire-pairs 3 to the wire-pairs 22 of the cable 12. The opening 16 is of sufficient diameter that the end of the post 6 may be covered with a dielectric cap which will also pass through the end of the connector 13. The purpose of this cap will be explained under "Operation" and "Modifications."

Figure 7:
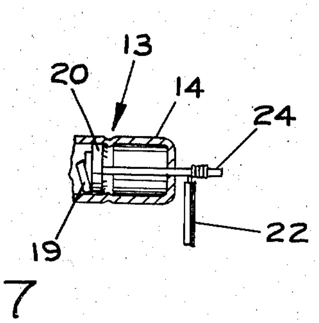
Fig. 7 is a fragmentary, central sectional view of a modified construction for the contacts of the connecting panel.

If the shell 14 is of an electrically conductive material, it will form part of the electrical circuit. If, however, the shell 14 is of dielectric material it is necessary to provide an electrical connection between the plate 20 and the wire 12. This may be done by the use of a post 24 (Fig. 7) secured to the plate 20 and extending through the closed end 15 of the shell. The wire 22 of the cable 12 is secured to the outer end of the post 24.

Figure 4:
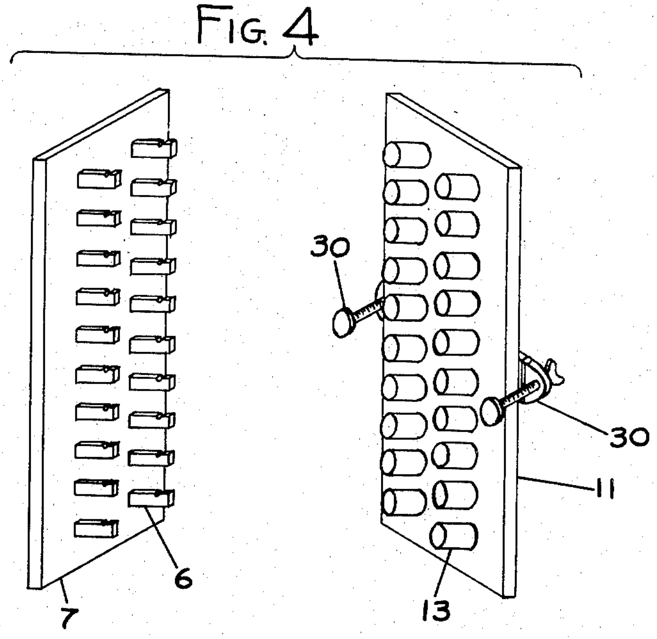
Fig. 4 is an exploded, oblique view of the terminal and connecting panels for my invention.

The connecting panel 11 is designed to be detachably secured to the terminal panel 7 by means of clamps 30 (Fig. 4). The clamps 30 are designed to detachably engage the back side of the terminal panel 7 and to draw the connecting panel 11 toward the terminal panel 7 sufficiently to assure positive engagement between each of the posts 6 and each of the contacts 13. It is unnecessary that the clamps locate the connecting panel 11 vertically of the terminal panel 7 since this will automatically be accomplished by the telescoping of the contacts 13 over the posts 6.

It will be recognized that the detachable clamps 30 are but one of many types of fastening means which may be used to temporarily secure the panels together. For this purpose it is conceivable to use simple carpenters' C-clamps. The only requirement of these clamps is that they be simple and easy to operate and permit rapid attachment and detachment of the panels one from another. My invention is not limited by the particular type of clamp used to secure the panels together.

Because telephone equipment operating in various offices is of different vintage and, therefore, of somewhat different design, the lateral spacing between the posts 6 may vary from one panel group to another. This may cause some difficulty in fitting the connecting panel to the terminal panel. This difficulty, however, may be overcome in a number of ways, one of which is illustrated in Fig. 6.

In the modified connecting panel 11*a*, the panel is vertically divided into two separate parts or halves 31 and 31*a*. Each of the panel halves 31 and 31*a* is equipped with a boss 32. The bosses 32 are connected by a rod 33 having left hand threads on one end and right hand threads on the other. At the center of the rod is a handle 34. By rotating the rod, the spacing between the panel halves 31 and 31*a* may be changed to align the contacts 13 with the posts 6 of the particular terminal panel to which the connecting panel 11*a* is to be secured.

It will be noted that the number of contacts 13 corresponds to the number of posts 6 whereby each wire-pair of the cable 3 will be connected to a corresponding wire-pair of the cable 12. Each wire of each of the wire-pairs 22 of the cable 12 is connected to an individual contact 40 of the selector 10. In the schematic presentation of the selector 10 in Fig. 2, the selector is illustrated as having a one hundred wire-pair capacity. The selector has an upper bank 41 of contact points 40 and a lower bank 42 of contact points 40. One wire of each wire-pair of the cable 12 is connected to one of the contact points 40 of the upper bank 41 and the other wire is connected to a corresponding contact point 40 in the lower bank 42. The points used for each pair of wires are aligned in the same vertical column in each bank and are spaced the same distance from the bottom of the bank. Thus, if one wire of a wire-pair of the cable 12 is connected to the contact point 40*a* in the upper bank 41, the other wire of this pair is connected to the corresponding contact point 40*b* in the lower bank 42.

Figures 2, 6:
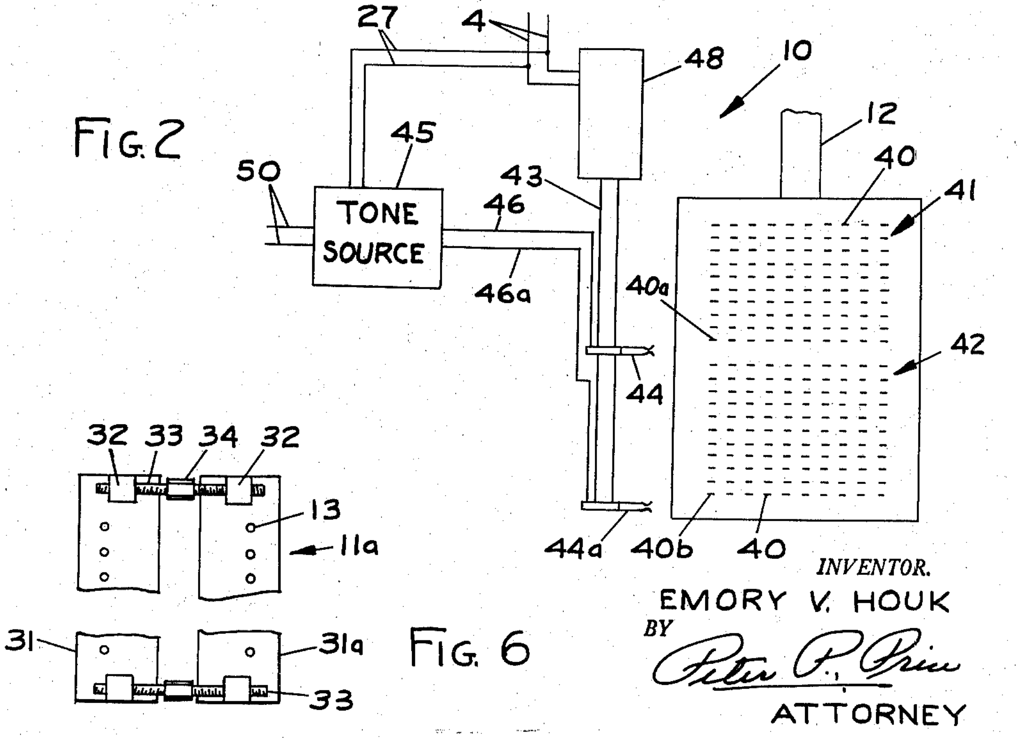
Fig. 2 is a schematic presentation of the selector equipment used with my invention.
Fig. 6 is a fragmentary view of a modified construction for the connecting panel.
Figure 3:
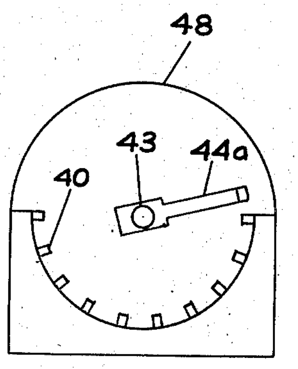
Fig. 3 is a bottom view of one form of selector which may be used in the operation of my invention.

While the banks of contact points 41 and 42 are, in the schematic presentation in Fig. 2, shown as though they were laid out on a flat plane, it will be seen by looking at Fig. 3 that actually they are arranged in a semi-circle with a shaft 43 centered about the point of origin of the semi-circle. On the shaft 43 there are mounted two pairs of contact fingers 44 and 44*a*. The pairs of contact fingers 44 and 44*a* are so spaced that when the upper pair of contact fingers 44 engages the contact point 40*a*, the lower pair of contact fingers 44*a* will engage the lower contact 40*b*. Each of the pairs of contact fingers 44 and 44*a* is individually connected to the tone source 45 by a separate wire designated as 46 and 46*a* respectively.

An actuator unit 48 is secured to the upper end of the shaft 43. The actuator unit 48 is designed both to move the shaft 43 vertically and to rotate the shaft in response to electrical signals received over the wire-pair 4. The actuator 48 is normally designed to adjust the shaft 43 vertically and thus also the connector fingers 44 and 44*a* while the connecting fingers 44*a* are in the angular position indicated in Fig. 3. Having located the shaft 43 in the proper vertical position, the actuator unit 48 then rotates the shaft to bring the fingers 44*a* into engagement with the preselected pair of contact points 40 in the upper and lower banks 41 and 42.

It will be recognized that the selector equipment described is but one of many types of conventional, automatic equipment operating in response to signals. Any type of automatic selector equipment having suitable capacity may be used with my invention. The invention is not limited to any particular type of selector equipment so long as it operates automatically and is of the type that will respond to conventional field equipment normally available for actuating such selectors. Conventionally, the field equipment available is a dial such as appears on the standard dial telephone. The illustration of a particular type of selector equipment has been made solely for the purpose of clarifying the explanation of this invention.

By means of the wire-pair 50 the tone source is connected to a suitable source of electrical energy 51. The power source may be a battery or generator such as is conventionally used at a dial exchange and, therefore, readily available. If it is necessary to operate this equipment in the field rather than at an exchange the power source will probably be a battery. Where it is used at a dial exchange the power is obtained merely by attaching the wires 50 to suitable terminals of which many are normally available in a telephone exchange. The power source, of course, is grounded at 52. In similar manner the sheath 2 of the cable 1 is grounded at 53.

In the field the splicer is provided with a dial instrument 60 of a type suitable to control the operation of the selector's actuator 48. The dial instrument 60 is connected to the wire-pair 4 of the cable 1 by means of the wire-pair 61.

The splicer is also equipped with a probe 62 which, in turn, is connected with a head phone 63 grounded by the wire 64 to the sheath 2 of the cable 1. It will be recognized that where the cable has a wholly dielectric sheath having no inner, grounded layer it will be necessary to provide some other grounding means such as by driving a stake in the ground and connecting the wire 64 to the stake. The probe 62 is of conventional construction and consists of a blunt pointed instrument which may be passed between the closely packed wire-pairs 3 of the cable 1 without injury to the insulation of these wires after the sheath has been removed.

Contained within the probe 62 is a coil in which signals carried by the wire-pairs 3 are induced. By means of the ear phones 63 or additional translation equipment, if necessary, the tone signal is converted into a signal audible to the splicer. Probes of this type and the connected audio equipment 63 are conventional and have been used for this type of work for many years. No invention is claimed in the use of this particular type of equipment except in combination with the rest of the equipment described in connection with this invention.

The tone signal used in this system may be of the audible or inaudible type. Preferably it is of the type which is inaudible or substantially inaudible on the standard telephone receiver. Thus, even though it is placed upon an operating line it will not cause interference with the use of that line by the customers. Such a signal could be of a frequency inaudible on the standard receiving instrument but quite audible on the particular receiving instrument used by the splicer.

When a cable is to be spliced and this invention used for the purpose of identifying the wire-pairs in the cable, the connecting panel 11 is first strapped to the terminal panel 7. This provides a connection between all of the wire-pairs in the cable 3 and the selector 10. In the event that certain of the wire-pairs in the cable 3 are operating and are of a special service type where it would be undesirable to connect them to the selector, a small cap of dielectric material, such as the cap 26 illustrated in Figs. 9 and 10, can be placed over the posts 6 of those particular wire-pairs to insulate the posts from the connectors 13, The mounting of the connecting panel on the terminal panel may be done by the splicer before he leaves the office or it may be done by a regular office frame attendant.

Having attached the selector, the tone signal is placed on a selected wire-pair. It is assumed for the purposes of this explanation that the eleventh wire-pair, i. e., wire-pair 4, of the cable 1 is not in use. This one is connected to the actuator unit 48 of the selector 10 (Fig. 2). The tone signal is connected to this pair by the wires 27.

When the splicer has reached the point of operation in the field and has opened the cable sheath 2, he attaches the wire 64 of the receiver 63 to the cable sheath. This automatically grounds the receiver. With the probe he then locates the wire-pair 4 carrying the tone signal. This is the wire-pair which will operate the selector. To this wire-pair he attaches the dial instrument 60.

After attaching the dial instrument 60 he will dial the first wire-pair such as the pair 01. The selector will then automatically place the tone signal on the pair 01. By means of the probe 62, the splicer may then seek through the wire-pairs in the cable until he locates the one carrying the tone signal. Having located the proper wire-pair, he tags that wire-pair with its identity number 01. The operation of this equipment not only permits the location of a particular wire-pair in the cable but it automatically identifies that particular wire-pair by the number it carries at the terminal panel. This latter has heretofore never been possible by wholly mechanical means.

Having identified wire-pair 01, the splicer dials 02. This automatically causes the selector to place the tone signal on the wire-pair 02 and the process of probing the cable for the wire-pair carrying the tone is repeated. This operation is repeated until all wire-pairs have been identified. In the event the selector places the tone signal on a wire-pair which is then in operation, the existence of a tone signal of the proper frequency on this wire will not interfere with the conversation being simultaneously carried on the wire because it will be audible only to the splicer.

When the splicer has completed the identification of all of the wire-pairs 3 in the cable 1, he may then want to repeat this same process on a second cable or on another wire-pair group within the same cable. In this case he contacts the central office and has a frame attendant at the central office move the connector panel 11 from the terminal panel 7 of the identified cable to the terminal panel of the unidentified cable. If it is convenient the same wire-pair 4 may be retained for the purpose of operating the selector. It is not essential that the wire-pair 4 be a component of the cable or wire group in which the wire-pairs are being identified. While this temporarily requires the services of the regular office attendant, it will be recognized that such services are required only when it is desired to move from one cable to the next. The operation can be completed in a few minutes while the actual operation of identifying the wire-pairs in the cable often takes hours. During the long interval the splicer is actually identifying the various wire-pairs of the cable, he requires no assistance when using this invention. Heretofore, his work has required the constant services of an assistant at the central office.

In a large office out of which there may be ten or fifteen splicers working, a single office attendant may serve all of the splicers. Thus, the services of fourteen assistants are eliminated. It will be seen that this system substantially reduces the cost of splicing and identifying cables and speeds the operation by putting it completely under the control of the splicer. Further, it automatically gives the splicer a positive numerical identification of the wire-pair simultaneously with its location in the cable. The equipment itself is relatively simple and may be used for years. The equipment uses nothing that is not already standard and conventional equipment available in any central, dial telephone office.

Figures 8, 9, 10, 11, 12, 13:
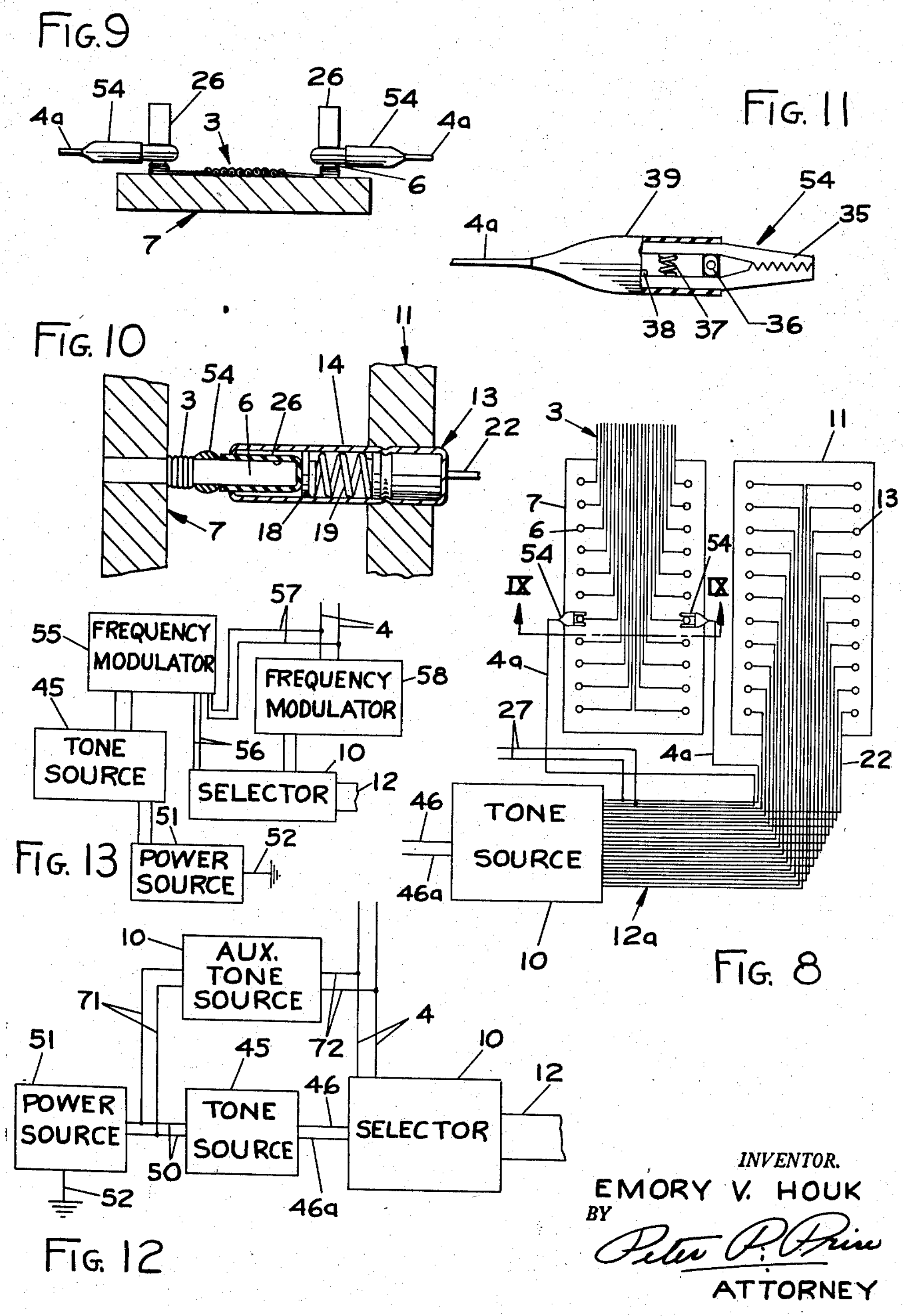
Fig. 8 is a diagrammatic presentation of a modified form of my invention.
Fig. 9 is an enlarged sectional view of the terminal panel taken along the plane IX—IX of Fig. 8.
Fig. 10 is a fragmentary, central sectional view of the assembled terminal and connecting panels utilizing the modification of my invention appearing in Fig. 1.
Fig. 11 is an enlarged, partially broken view of a wire clamp.
Fig. 12 is a fragmentary, diagrammatic view of a modified arrangement for my invention.
Fig. 13 is a fragmentary, diagrammatic view of a further modified arrangement for my invention.

*Modifications*

Where the identification is to be done on a wire cable with no wire-pairs in operation, there is no problem of selecting an appropriate wire-pair for operating the selector 10. Where, however, the work has to be done on a cable in which some or all of the wire-pairs are in operation, the problem of selecting the wire-pair for operating the selector may become somewhat more difficult. In this case a vacant wire-pair is selected or an operating wire-pair is temporarily de-commissioned to provide the necessary selector operating circuit. Such a wire-pair may be one in the middle of the terminal panel 7. In this case, the wires of the wire-pair **4*a* (Figs. 8, 9, 10 and 11) for controlling the operation of the selector 10 are detachably connected to the posts 6 of the selected wire-pair of the cable 1 by clamps 54. The clamps 54 grip the posts 6 immediately outwardly of the wires 3 (Fig. 9). The outer ends of the posts 6 are covered by dielectric caps 26. These caps 26 may be of rubber or any suitable plastic material and merely slip snugly over the ends of the posts. The purpose of the caps 26 is to electrically insulate the posts 6 from their connectors 13 on the connecting panel 11. This is desirable to separate the selector actuating wire-pair from the wire-pairs for which the selector 10** functions as the circuit opening and closing equipment.

When this arrangement is used, it is assumed that the wire-pair of the cable 1 to which the wire-pair **4*a* is connected will be vacant except for this purpose, at least during its use for operating the selector actuator unit 48. It will then be connected to the tone source 45 by the wire-pair 27. In Fig. 8 the wire-pair 27 is shown as by-passing the selector. This is for illustrative purposes only. In practice this connection will be made within the selector 10**.

In Fig. 8 the wire-pair **4*a* is incorporated in the cable 12*a*. This, of course, may be done irrespective of whether the clamping arrangement for connection to the posts 6** is utilized.

The clamps 54 are of conventional design consisting of a pair of jaws 35 pivoted at 36 and urged into closed position by the spring 37. The wire **4*a* is attached to one of the jaws at 38 by suitable means such as soldering. To protect the attachment of the wire and clamp, the clamp may be partially sheathed in a flexible cover 39**.

Where the tone signal generated by the tone source 45 is of a conventional type, audible over the standard telephone receiver, it may be desirable to use a special tone signal on the wire-pair 4 of a frequency inaudible over the standard telephone receiver but audible over the splicer's receiver 63. In this case the splicer's receiver is adapted to receive both types of tone signals. The special tone signal is supplied by the auxiliary tone source 70 (Fig. 12) connected to the power source by the wires 71 and to the wires 4 by the wires 72.

Under circumstances where the selector equipment must be operated over a wire-pair which is in customer use, it is possible to modulate the frequency of the signal pulses controlling the actuator unit 48 of the selector 10 in such a manner that both the conversation and the signal pulses for the actuator unit may be simultaneously transmitted by the same wire-pair without interference with either the customer or the splicer.

The tone signal may be generated by special equipment adapted to produce a tone signal of the desired frequency or it may be produced by tone source equipment providing a standard signal and the signal passed through a frequency modulator to change the frequency to one which is inaudible over the standard telephone receiver. The latter arrangement is illustrated in Fig. 13.

The tone source 45 generates a conventional tone signal. The frequency of this tone signal is changed by the frequency modulator 55 to one which will not interfere with the customer. The modulated signal is transmitted to the selector 10 by the wire-pair 56. It is also supplied to the selector actuator operating wire-pair 4 by the wires 57. This permits a non-interfering tone signal to be used for the initial identification of the wire-pair 4. The signal impulse used to drive the actuator unit of the selector 10 is also passed through a frequency modulator 58. This permits the selector to operate over a wire-pair simultaneously carrying a conversation or other electronic signals without interfering between the dual usage. By modulating the operating signal pulse for the actuator between the actuator unit and the cable 1, an actuator unit of conventional design may be utilized.

It will be recognized that various other modifications of my invention may be made. Those modifications which employ the principle of my invention are to be considered as included in the hereinafter appended claims unless these claims by their language expressly state otherwise.

I claim:

1. In means for identifying by number wire-pairs in a multi-pair cable wherein said wire-pairs are numerically identified at one end, the combination comprising: a non-sequential wire-pair selector adapted to select a wire-pair by the identification number of said wire-pair at said one end, and means connecting said selector to one wire-pair of said cable; means attached to said one wire-pair for controlling the operation of said selector; means at one end of said cable detachably connecting said selector to each of said wire-pairs except said one wire-pair; a signal source and means connecting said signal source to said selector; a probe adapted to pass between the wire-pairs of said cable to receive a signal placed on a wire-pair by said selector.

2. In means for identifying by number wire-pairs in a multi-pair cable wherein said wire-pairs are numerically identified at one end, said combination comprising: a non-sequential wire-pair selector having a driving unit, said selector adapted to select wire-pairs according to the identification number at said one end; means attached to one wire-pair for controlling the operation of said selector; means at one end of said cable detachably connecting said selector to each of said wire-pairs, said means having a pair of wires connected to said one wire-pair and to said driving unit; a signal source and means connecting said signal source to said selector; a probe adapted to pass between the wire-pairs of said cable to receive a signal placed on a wire-pair by said selector.

3. In means for transmitting a signal from a signal source through a multi-pair cable for identification purposes each of the wires of said cable being individually connected to a post on a terminal panel, the combination comprising: a signal source; a connecting panel; a plurality of terminal contacts on said connecting panel; a non-sequential selector adapted to place a signal from said signal source on predetermined contacts; means connecting each of said contacts to said selector; the number and spacing of said contacts corresponding to the number and spacing of said posts; means for detachably securing said connecting panel to said terminal panel with each of said contacts bearing against one of said posts whereby each of said wires of said cable is connected to said selector and signals from said signal source can be transmitted through predetermined wires electrically connected to said predetermined contacts.

4. In means for transmitting a signal from a signal source through a multi-pair cable for identification purposes each of the wires of said cable being individually connected to a post on a terminal panel, the combination comprising: a signal source; a connecting panel; a plurality of contacts on said connecting panel; a non-sequential selector adapted to place a signal from said signal source on predetermined contacts; means connecting each of said contacts except two to said selector; means connecting said two contacts to said driving unit; the number and spacing of said contacts corresponding to the number and spacing of said posts; means for detachably securing said connecting panel to said terminal panel with each of said contacts bearing against one of said posts whereby each of said wire-pairs of said cable except one is connected to said selector and signals from said signal source can be transmitted through predetermined wires electrically connected to said predetermined contacts; said one wire-pair being electrically connected to said contacts for operating said selector.

5. In means for transmitting a signal from a signal source through a multi-pair cable for identification purposes each of the wires of said cable being individually connected to a post on a terminal panel, the combination comprising: a signal source; a connecting panel and means for detachably clamping said connecting panel to said terminal panel, a plurality of contacts on said connecting panel; one contact adapted to bear against each of said posts when said panels are clamped together; means connecting each of said contacts to said selector; means detachably connecting said driving unit to one wire-pair of said cable.

6. In means for identifying wire-pairs in a multi-pair cable, a terminal panel having a plurality of individual posts, each wire of each of said pairs attached to a separate one of said posts, each of said posts being visually identified, said means comprising: a tone signal source; a non-sequential wire-pair selector connected to said tone signal source and having a driving unit and means connecting said driving unit to one wire-pair of said cable; means attached to said one wire-pair for controlling the operation of said driving unit; a connecting panel; a plurality of contacts on said connecting panel, the number and spacing of said contacts corresponding to the number and spacing of said posts on said terminal panel; means connecting each of said contacts to said selector; said selector adapted to place said tone signals from said signal source on predetermined contacts of said panel; a probe adapted to pass between the wire-pairs of said cable to receive a tone signal placed on said contacts for passing said tone through said wires as controlled by said selector.

7. In means for identifying wire-pairs in a multi-pair cable, a terminal panel having a plurality of individual posts, each wire of each of said pairs attached to a separate one of said posts, each of said posts being visually identified, said means comprising: a tone signal source; a non-sequential wire-pair selector connected to said tone source and having a driving unit and means connecting said driving unit to one wire-pair of said cable; means attached to said one wire-pair, said means adapted to generate an electrical signal pulse for controlling the operation of said driving unit; said selector adapted to select wire-pairs according to their visual identification at said one end; means for modulating the frequency of the driving unit operating signal whereby said signal is inaudible on the conventional telephone receiver; a connecting panel; a plurality of contacts on said connecting panel, the number and spacing of said contacts corresponding to the number and spacing of said posts on said terminal panel; means connecting each of said contacts to said selector; a tone signal source and means connecting said tone signal source to said selector; meas for modulating the frequency of said tone signal whereby said tone signal is inaudible on the conventional telephone receiver; a probe adapted to pass between the wire-pairs of said cable to receive a tone signal placed on a wire-pair by said selector.

8. The method of identifying by number wires in a multi-wire cable which at one point is connected to a terminal panel, comprising the steps of causing an electrical signal to originate at said terminal panel and to pass through predetermined wires, and probing the wires at a point on said cable remote from said panel in order to determine through which wires said electrical signal is being transmitted, the improvement comprising: individually selecting in non-sequential order the wires through which said electrical signal is transmitted said selecting being accomplished by means of an automatic selector; and controlling the operation of said selector by means located at said remote point where said wires are being probed.

9. A method of identifying by number wires in a multi-wire cable wherein at one point of said cable each wire is connected to and is numerically identified by a terminal board, and in such method an electrical signal is transmitted from a locality near said board to a point on said cable remote from said panel and the wires of said cable at said remote point are probed in order to determine through which wires said electrical signal is transmitted, the improvement comprising: individually selecting in non-sequential order the wires through which said electrical signal is transmitted said selecting being accomplished by means of an automatic selector, and controlling the operation of said selector by means of an electrical signal transmitted to said selector through said cable from said remote point.

10. In means for identifying by number wires in a multi-wire cable wherein said wires are numerically identified at one end, the combination comprising: a non-sequential wire selector adapted to select wires by the identification number at said one end, and means connecting said selector to predetermined wires of said cable; means attached to said predetermined wires for controlling the operation of said selector; means at one end of said cable detachably connecting said selector to each of said wires except said predetermined wires; a signal source and means connecting said signal source to said selector; a probe adapted to pass between the wires of said cable to receive a signal placed on wires by said selector.

11. In means transmitting a signal from a signal source through a multi-wire cable for identification purposes each of the wires of said cable being connected to a post on a terminal panel, the combination comprising: a signal source a connecting panel; a plurality of terminal contacts on said connecting panel; a non-sequential selector adapted to place a signal from said signal source on predetermined contacts; means connecting each of said contacts to said selector; the number and spacing of said contacts corresponding to the number and spacing of said posts; means for detachably securing said connecting panel to said terminal panel with each of said contacts bearing against one of said posts whereby each of said wires of said cable is connected to said selector and signals from said signal source can be transmitted through predetermined wires electrically connected to said predetermined contacts.

12. A method of identifying by number wires in a multi-wire cable which at one point is connected to a terminal panel, comprising the steps of causing an electrical signal to originate at said terminal panel, and to pass through predetermined wires which are numerically identified at said terminal panel, and probing the wires at a remote point of said cable in order to determine through which wires said electrical signal is being transmitted, thereby determining the numerical identity of said wires at said remote point, the improvement comprising: individually selecting in non-sequential order the wires by their numerical identity through which said electrical signal is transmitted said selecting being accomplished by means of an automatic selector, and controlling the operation of said selector by means of a numerical identifying dial located at said remote point where said wires are being probed.

13. In means for identifying wires in a multi-wire cable, a terminal panel having a plurality of individual posts, each wire of said cable attached to a separate one of said posts, each of said posts being visually identified, said means comprising: a tone signal source; a wire selector connected to said tone signal source and having a driving unit and means connecting said driving unit to predetermined wires of said cable; means attached to said predetermined wires for controlling the operation of said driving unit; a connecting panel; a plurality of contacts on said connecting panel, the number and spacing of said contacts corresponding to the number and spacing of said posts on said terminal panel; means connecting each of said contacts to said selector; said selector adapted to place said tone signals from said signal source on predetermined contacts of said panel; a probe adapted to pass between the wires of said cable to receive a tone signal placed on said contacts for passing said tone through wires as controlled by said selector.

References Cited in the file of this patent

UNITED STATES PATENTS

| | | |
|---|---|---|
| 1,340,935 | Clausen et al. | May 25, 1920 |
| 2,133,384 | Fisher et al. | Oct. 18, 1938 |
| 2,244,041 | Andrews | June 3, 1941 |
| 2,524,141 | Rosenblum | Oct. 3, 1950 |
| 2,529,227 | Rosenblum | Nov. 7, 1950 |
| 2,622,130 | Kabell et al. | Dec. 16, 1952 |

FOREIGN PATENTS

| | | |
|---|---|---|
| 119,561 | Sweden | Sept. 2, 1947 |